(12) United States Patent
Cottrell et al.

(10) Patent No.: US 10,139,186 B2
(45) Date of Patent: Nov. 27, 2018

(54) TRIGGER PULL FORCE GAUGE

(71) Applicant: Battenfeld Technologies, Inc., Columbia, MO (US)

(72) Inventors: Michael Cottrell, Columbia, MO (US); Michael Poehlman, Columbia, MO (US); James Gianladis, Harrisburg, MO (US); Adam J. Birk, Hallsville, MO (US)

(73) Assignee: Battenfield Technologies, Inc., Columbia, MO (US)

( * ) Notice: Subject to any disclaimer, the term of this patent is extended or adjusted under 35 U.S.C. 154(b) by 284 days.

(21) Appl. No.: 14/995,426

(22) Filed: Jan. 14, 2016

(65) Prior Publication Data

US 2017/0205181 A1 Jul. 20, 2017

(51) Int. Cl.
*G01L 1/22* (2006.01)
*G01L 5/22* (2006.01)
*F41A 31/00* (2006.01)

(52) U.S. Cl.
CPC ................ *F41A 31/00* (2013.01); *G01L 1/22* (2013.01); *G01L 5/22* (2013.01)

(58) Field of Classification Search
CPC .................................. F41A 31/00; G01L 5/22
USPC ............................................. 73/862.381, 431
See application file for complete search history.

(56) References Cited

U.S. PATENT DOCUMENTS

| | | | |
|---|---|---|---|
| 3,882,489 A | 5/1975 | Guggolz | |
| 4,453,414 A | 6/1984 | Ronemus et al. | |
| 5,195,381 A | 3/1993 | Keibler | |
| 5,471,885 A | 12/1995 | Wagner | |
| 5,545,855 A | 8/1996 | Standfield et al. | |
| 5,761,954 A * | 6/1998 | Dvorak | G01L 5/22 73/167 |
| 5,986,222 A | 11/1999 | Helberg | |
| 6,014,901 A | 1/2000 | Boe | |
| 6,086,375 A | 7/2000 | Legros | |
| 6,668,700 B1 * | 12/2003 | Danner | F41A 19/58 89/135 |
| 6,854,975 B2 * | 2/2005 | Ranzinger | F41A 31/00 33/199 R |
| 6,957,911 B2 * | 10/2005 | Wong | G01K 1/083 374/163 |
| 7,559,252 B2 * | 7/2009 | Schadler | G01L 5/103 73/826 |
| 7,833,035 B2 * | 11/2010 | Lin | H01R 12/88 439/260 |
| 8,960,024 B2 * | 2/2015 | Lee | G01L 1/2231 73/862.634 |
| 9,046,434 B2 * | 6/2015 | Nagai | G01G 23/005 |

(Continued)

OTHER PUBLICATIONS

Midway USA, Mar. 2000, AD #03100, RCBS Premium Trigger Pull Scale, 2 pages.

*Primary Examiner* — Harshad R Patel
*Assistant Examiner* — Jamel Williams
(74) *Attorney, Agent, or Firm* — Stinson Leonard Street (57) ABSTRACT

Trigger pull force gauge and methods of use. The trigger pull force gauge includes a housing and an arm extending therefrom. The trigger pull force gauge can include a load cell located at a distal portion of the arm spaced from the housing. The arm can be movable with respect to the housing for selectively positioning the arm in a deployed position and a stowed position with respect to the housing.

26 Claims, 10 Drawing Sheets

(56) References Cited

U.S. PATENT DOCUMENTS

| | | | |
|---|---|---|---|
| 9,726,549 B2* | 8/2017 | Lin .......................... | G01K 1/08 |
| 2002/0195282 A1 | 12/2002 | Thadani | |
| 2004/0018472 A1* | 1/2004 | Ranzinger ............... | F41A 31/00 |
| | | | 434/16 |

* cited by examiner

FIG. 10

TRIGGER PULL FORCE GAUGE

FIELD

The present disclosure generally relates to weapon testing and adjustment accessories, and more particularly to a gauge for measuring a pull force of a trigger of a weapon.

BACKGROUND

Many types of weapons have triggers for firing the weapons. For various reasons, a user may want to measure a pull force of the trigger required to fire the weapon. For example, some types of weapons, such as some types of firearms, have trigger mechanisms that are adjustable for adjusting the pull force of the trigger required for firing the weapon. A trigger pull force gauge can be useful for adjusting a trigger mechanism to fire a weapon at a desired trigger pull force.

SUMMARY

One aspect of the present invention is directed to a trigger gauge for measuring a pull force of a trigger of a weapon. The gauge includes a housing sized to be held by a hand of a user. The gauge includes an arm supported by the housing. The arm has a proximal portion operatively connected to the housing and has a distal portion. A load cell is located at the distal portion of the arm. The load cell includes a trigger engagement head configured for engaging the trigger. The load cell is operable to generate an electrical signal responsive to a force on the trigger engagement head for measuring the pull force of the trigger.

Another aspect of the present invention is directed to a method of measuring a pull force of a trigger of a weapon. The method includes providing a trigger gauge including a housing and an arm supported by the housing. The arm includes a distal portion having a load cell thereon spaced from the housing. The method includes pressing a trigger engagement head of the load cell against the trigger to cause the load cell to generate an electrical signal for measuring the pull force of the trigger. A trigger pull force value is displayed on a display of the trigger gauge representative of the pull force of the trigger.

Yet another aspect of the present invention is directed to a trigger gauge for measuring a pull force of a trigger of a weapon. The gauge includes a housing sized to be held by a hand of a user. The gauge includes an arm supported by the housing. The arm has a proximal portion operatively connected to the housing and has a distal portion. A trigger engagement head is located at the distal portion of the arm for engaging the trigger. A display supported by the housing is operable to display a trigger pull force value representative of a pull force applied to the trigger engagement head. The arm is connected to the housing via a pivot connection. The pivot connection permits the arm to pivot with respect to the housing about a first pivot axis between a deployed position and a stowed position different than the deployed position. The trigger engagement head in the deployed position is spaced from the housing for engaging the trigger. The trigger engagement head in the stowed position is closer to the housing than in the deployed position.

Other objects and features of the present invention will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
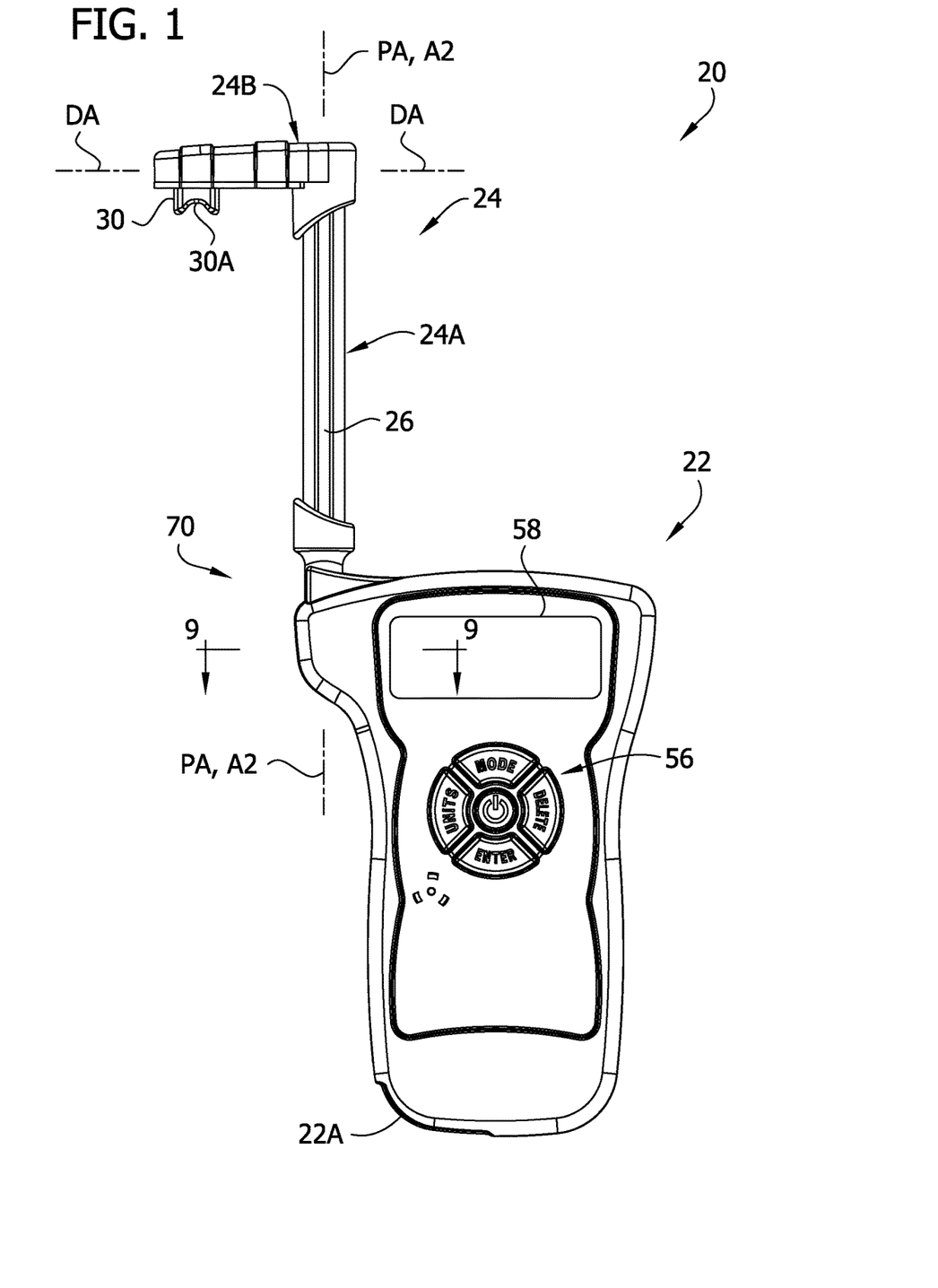
FIG. 1 is a front elevation of a trigger gauge embodying aspects of the present invention, an arm of the trigger gauge being shown in a deployed position with respect to a housing of the trigger gauge.

Referring to FIG. 1, a trigger gauge embodying aspects of the present invention is designated generally by the reference number 20. As will become apparent, the trigger gauge is configured for measuring a trigger pull force required for firing a weapon. The trigger gauge 20 enables a user to make an accurate measurement of trigger pull force and displays a measured trigger pull force value to the user. If desired, the user can adjust a trigger mechanism of the weapon such that the weapon fires at a desired trigger pull force. In the illustrated embodiment, the trigger gauge 20 is a hand tool, meaning the trigger gauge is sized and shaped to be held by a hand of a user during use. While held by the user, the trigger gauge 20 can be engaged with the trigger of the weapon for pulling the trigger to measure the trigger pull force. Other configurations can be used without departing from the scope of the present invention.

As shown in FIG. 1, the trigger gauge 20 includes a housing 22 and an arm 24 operatively connected to and extending from the housing. The housing 22 is sized to be held by a hand of a user. The housing has an interior for housing various components of the trigger gauge, as explained in further detail below. The arm 24 has a proximal portion 24A located proximally with respect to the housing 22 and a distal portion 24B located distally with respect to the housing. In the illustrated embodiment, the proximal portion 24A includes a rod 26 connected to the housing. The proximal portion 24A has a longitudinal axis PA, and the distal portion 24B has a longitudinal axis DA. The longitudinal axes PA, DA extend in transverse directions. Although the first and second directions are illustrated as being perpendicular to one another, other transverse relationships (e.g., other angles) of the first and second directions can be used without departing from the scope of the present invention. A trigger engagement head 30 is located at the distal portion 24B of the arm 24 for being engaged with a trigger of a weapon. It will be appreciated that the distal portion 24B is configured for fitting in a trigger guard of a weapon so the trigger engagement head 30 can be engaged with the trigger. The trigger engagement head 30 defines a valley 30A for receiving the trigger in a consistent position on the trigger engagement head.

Figure 2:
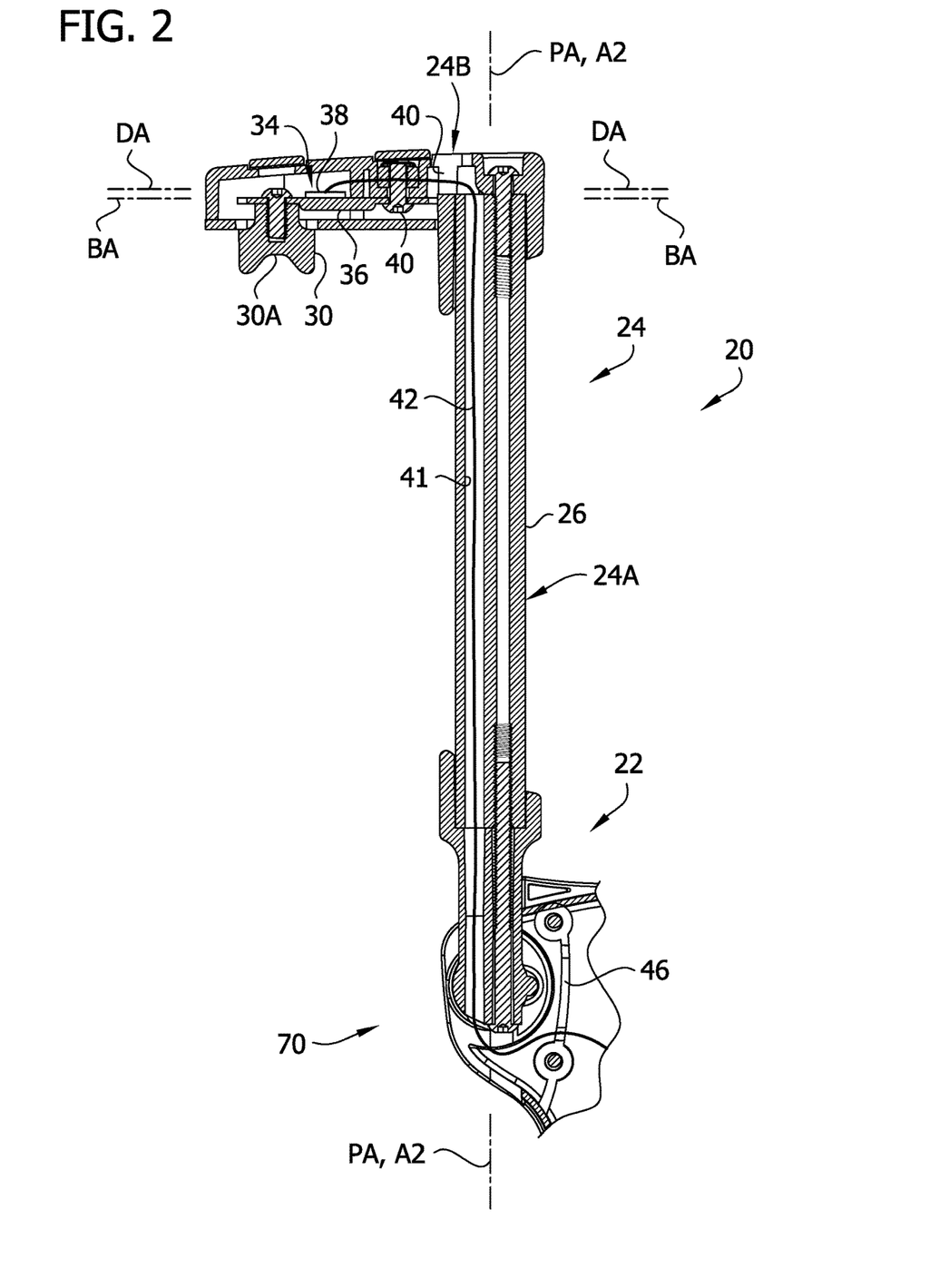
FIG. 2 is an enlarged fragmentary section of the trigger gauge.

Referring to FIG. 2, a load cell 34 is partially housed in the distal portion 24B of the arm 24. The load cell 34 is operable to generate an electrical signal responsive to a force on the trigger engagement head 30 for measuring the pull force of the trigger. The load cell 34 includes the trigger engagement head 30, and further includes a bar 36 and a strain gauge 38. The bar 36 has a longitudinal axis BA extending transversely with respect to the longitudinal axis PA of the arm proximal portion 24A. Although the axes BA, PA are illustrated as being perpendicular to one another, other transverse relationships (e.g., other angles) can be used without departing from the scope of the present invention. The bar 36 has a proximal section mounted by a screw 40 to the distal portion 24B of the arm 24 so that the bar is supported in cantilever fashion. A distal section of the bar is free from connection to the arm to permit deflection of the bar. The trigger engagement head 30 is mounted near the distal end of the bar. The strain gauge 38 is mounted on an intermediate section of the bar 36 between the proximal and distal ends of the bar and between the trigger engagement head 30 and the screw 40. It will be appreciated that forcing the trigger engagement head 30 against the trigger generates strain in the deflecting bar 36 that is sensed by the strain gauge 38. Desirably, the arm 24 provides relatively rigid support for the proximal end of the bar 36 such that resistive force of the trigger on the trigger engagement head 30 causes deflection of the bar rather than deflection of the arm 24. The strain gauge 38 generates an electrical signal representative of the strain in the bar 36. Other types of load cells can be used without departing from the scope of the present invention. For example, the substrate (e.g., bar 36) on which the strain gauge is mounted can have other configurations, greater numbers of strain gauges can be used, and/or load cells not having a strain gauge can be used. Moreover, the trigger engagement head can have other configurations without departing from the scope of the present invention. For example, the trigger engagement head can have other shapes and sizes, and/or the trigger engagement head can be formed integrally with the substrate on which the strain gauge is mounted.

Still referring to FIG. 2, the arm 24 includes a passage 41 through which at least one electrical signal transmission line 42 extends for transmitting electrical signals from the load cell 34. In the illustrated embodiment, the passage 41 includes a first segment extending in the distal portion 24B of the arm 24 and a second segment extending in the proximal portion 24A of the arm. A port 46 in the housing 22 is provided to permit the at least one electrical signal transmission line 42 to enter the housing. For example, one or more electrical signal transmission lines 42 such as various types of wires can be used.

Figure 3:
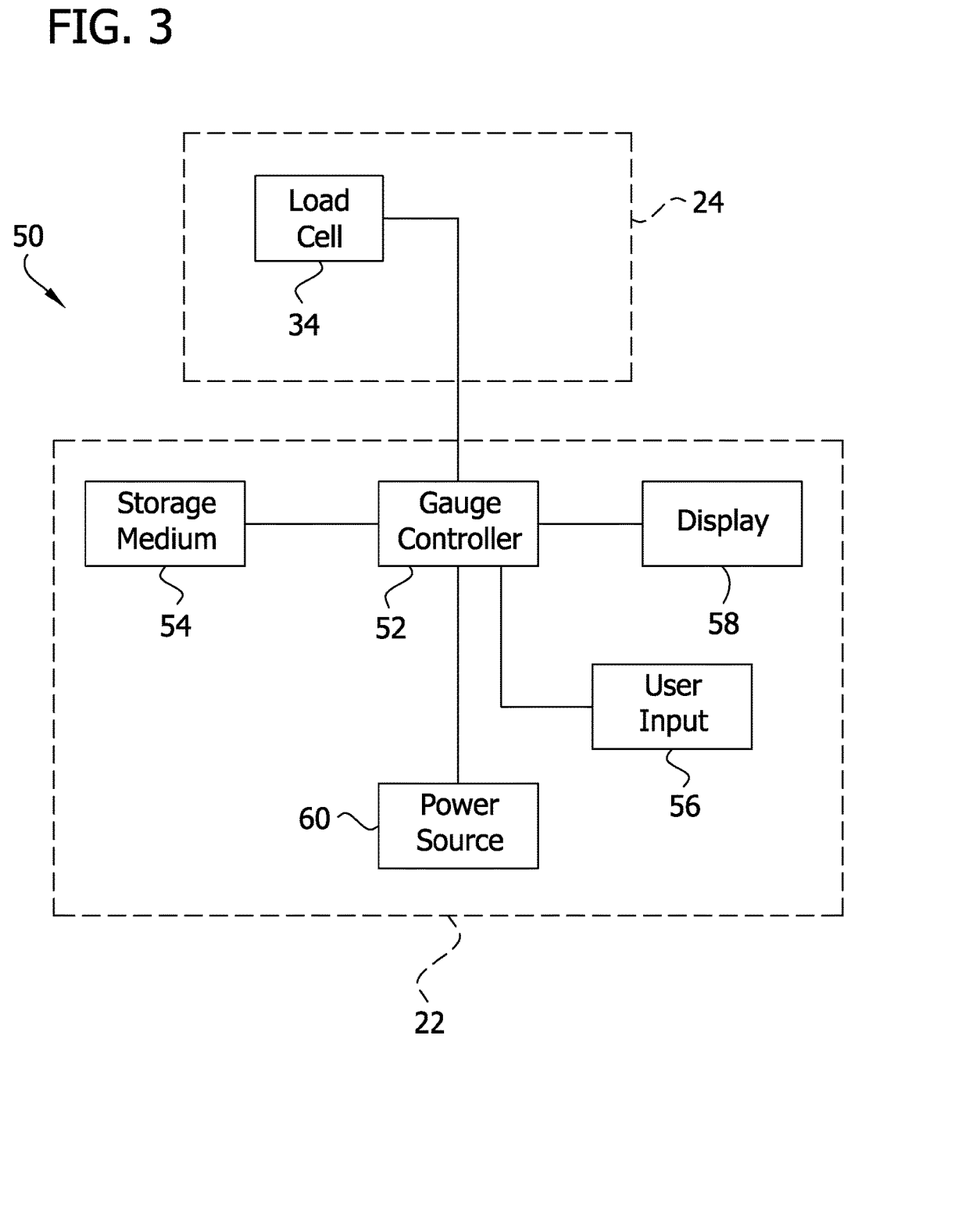
FIG. 3 is a schematic diagram of a control system of the trigger gauge.

As shown schematically in FIG. 3, a control system 50 of the trigger gauge 20 includes a gauge controller 52, a tangible storage medium (e.g., including forms of storage such as software and/or firmware) 54, and a user interface including a user input 56 and a display 58. For example, a printed circuit board (not shown) in the housing 22 can be configured to include the gauge controller 52 and the storage medium 54. The gauge controller 52 is configured for reading and executing instructions stored in the storage medium 54, and is responsive to the user input 56, for controlling operation of the trigger gauge 20. A user can enter and/or modify instructions stored on the storage medium 54 via the user input 56. In the illustrated embodiment, as shown in FIG. 1, the user input 56 includes several buttons, and the display 58 is a liquid crystal display. In the illustrated embodiment, the user input 56 includes buttons for power, mode of measurement, units of measurement, delete or reset, and entry of selections. Other functionalities may be associated with the buttons within the scope of the present invention. The control system 50 is powered by a power source 60, such as at least one battery.

In use, the user operates the trigger gauge 20 using the user input 56, engages the trigger engagement head 30 with the trigger to apply sufficient force to pull the trigger, and a trigger pull force value (e.g., average and/or maximum pull force) is displayed on the display 58. The gauge controller 52 receives electrical signals from the load cell 34 responsive to force applied to the load cell. The gauge controller 52 determines the trigger pull force based on the signals from the load cell 34 and transmits an electrical trigger pull force value signal to the display 58, which causes the display to display the trigger pull force value. Other types of control systems can be used without departing from the present invention. For example, the load cell can be operatively connected to the gauge controller and/or display in other ways, such as wirelessly.

Figure 4:
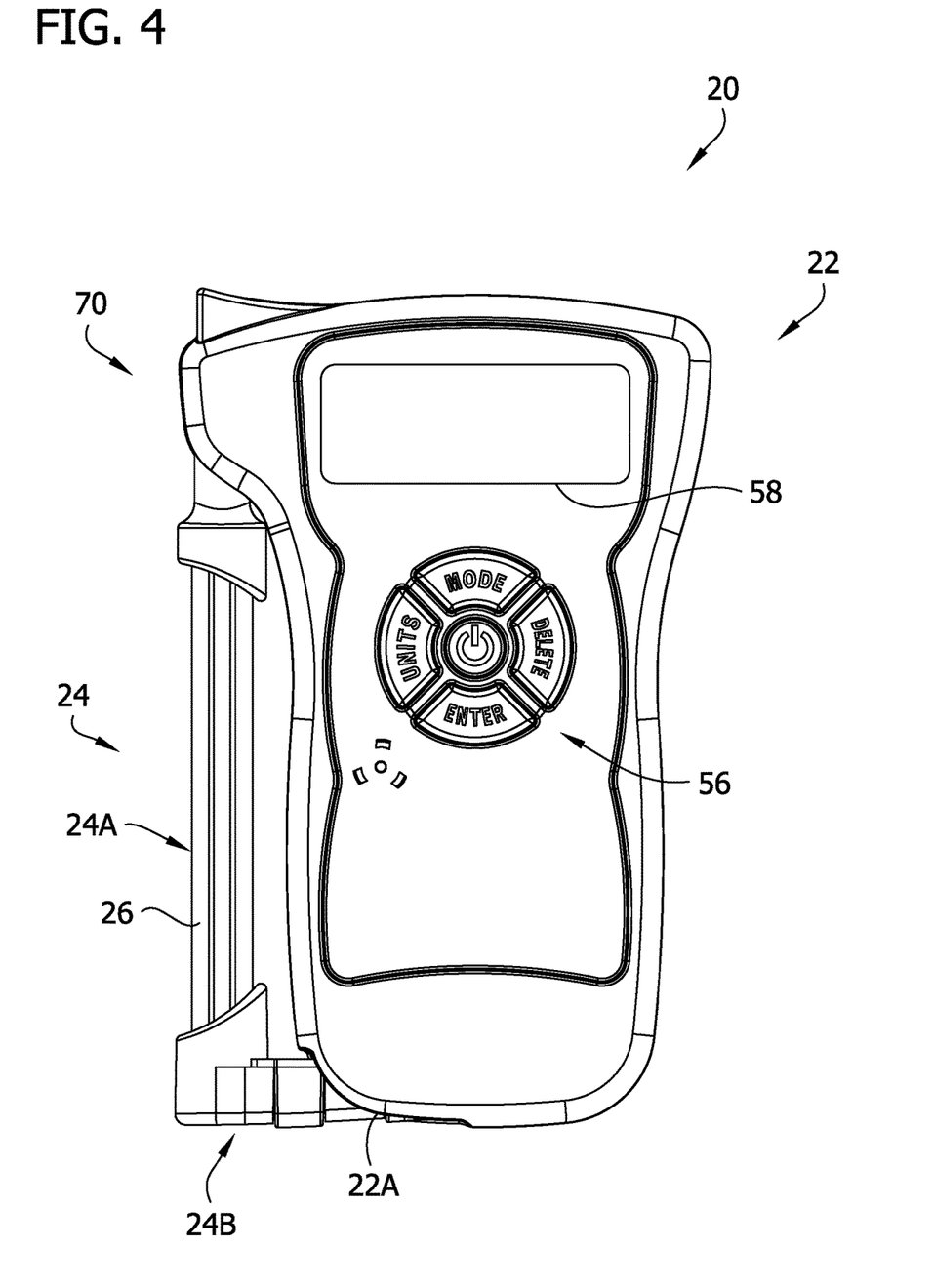
FIG. 4 is a front elevation of the trigger gauge having the arm in a stowed position.

As shown by comparison of FIGS. 1 and 4, the arm 24 can be moved from a deployed position to a stowed position when the trigger gauge 20 is not in use. The proximal portion 24A is connected to the housing 22 via a pivot connection 70 permitting the arm 24 to pivot about a pivot axis A1 (FIG. 8) between the deployed position (e.g., FIGS. 1, 7) and the stowed position (e.g., FIG. 4). In the deployed position, the arm 24 extends away from the housing 22, and the trigger engagement head 30 is spaced from the housing 22 for engaging the trigger. In the stowed position, the arm 24 is adjacent to and extends along the housing 22, and at least the distal portion 24B is received in a recess or receiver 22A in a lower portion of the housing to protect the load cell 34. The trigger engagement head 30 is closer to the housing 20 in the stowed position than in the deployed position.

Figure 5:
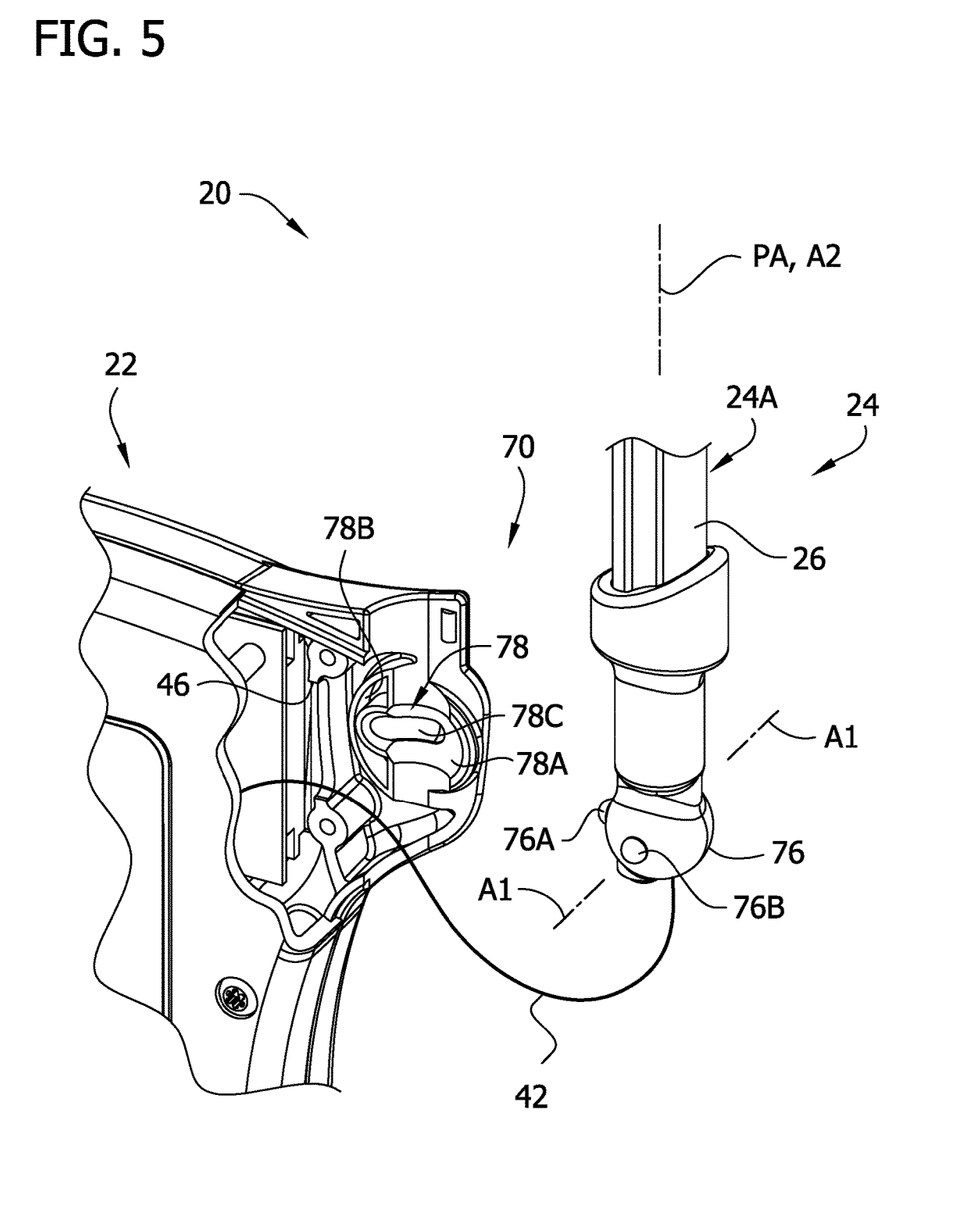
FIG. 5 is an enlarged, partially exploded fragmentary rear perspective of the trigger gauge illustrating details of a pivot connection of the arm with the housing.

The pivot connection 70 is shown in closer detail in FIG. 5. The pivot connection 70 includes a ball 76 at a proximal end of the arm proximal portion 24A, and a socket 78 at the upper end of the housing 22. The socket 78 includes two generally cup-shaped portions 78A, only the forward cup-shaped portion being shown in FIG. 5. It will be understood that the rear cup-shaped portion 78A is essentially a mirror image of the forward portion. The cup-shaped portions 78A cradle opposite sides of the ball 76 for connecting the arm 24 to the housing 22. The cup-shaped portions 78A are spaced from each other to define a vertical arcuate track 78B. The ball 76 includes a first rounded protrusion 76A extending therefrom. The first rounded protrusion 76A is usually received in the vertical arcuate track 78B. As shown by comparison of FIGS. 6 and 7, when the first rounded protrusion 76A is received in the vertical arcuate track 78B, the first rounded protrusion is movable along the vertical arcuate track for pivoting the arm 24 between the deployed and stowed positions.

Figure 6:
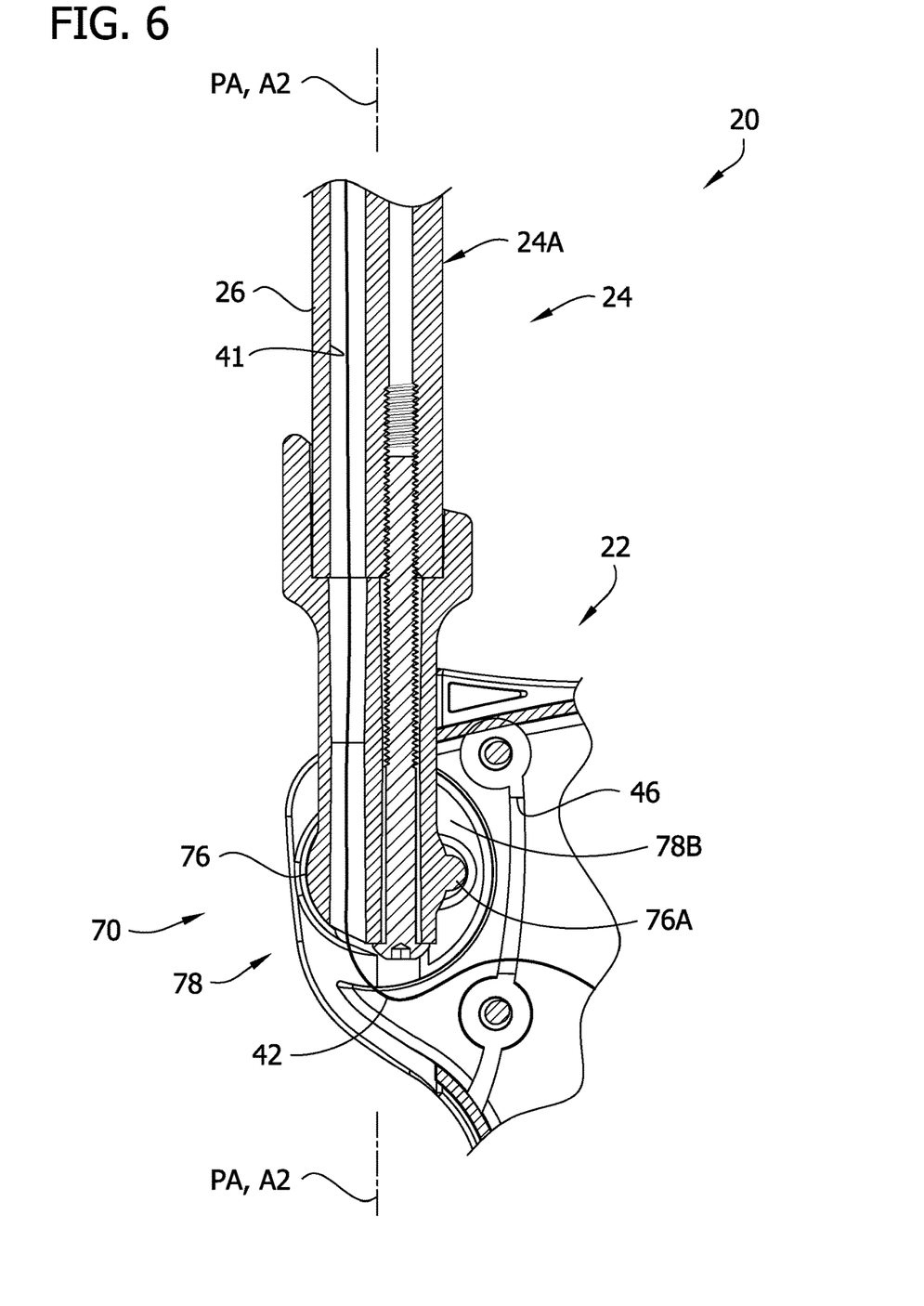
FIG. 6 is an enlarged fragmentary section of the trigger gauge, the arm being shown in the deployed position.
Figure 7:
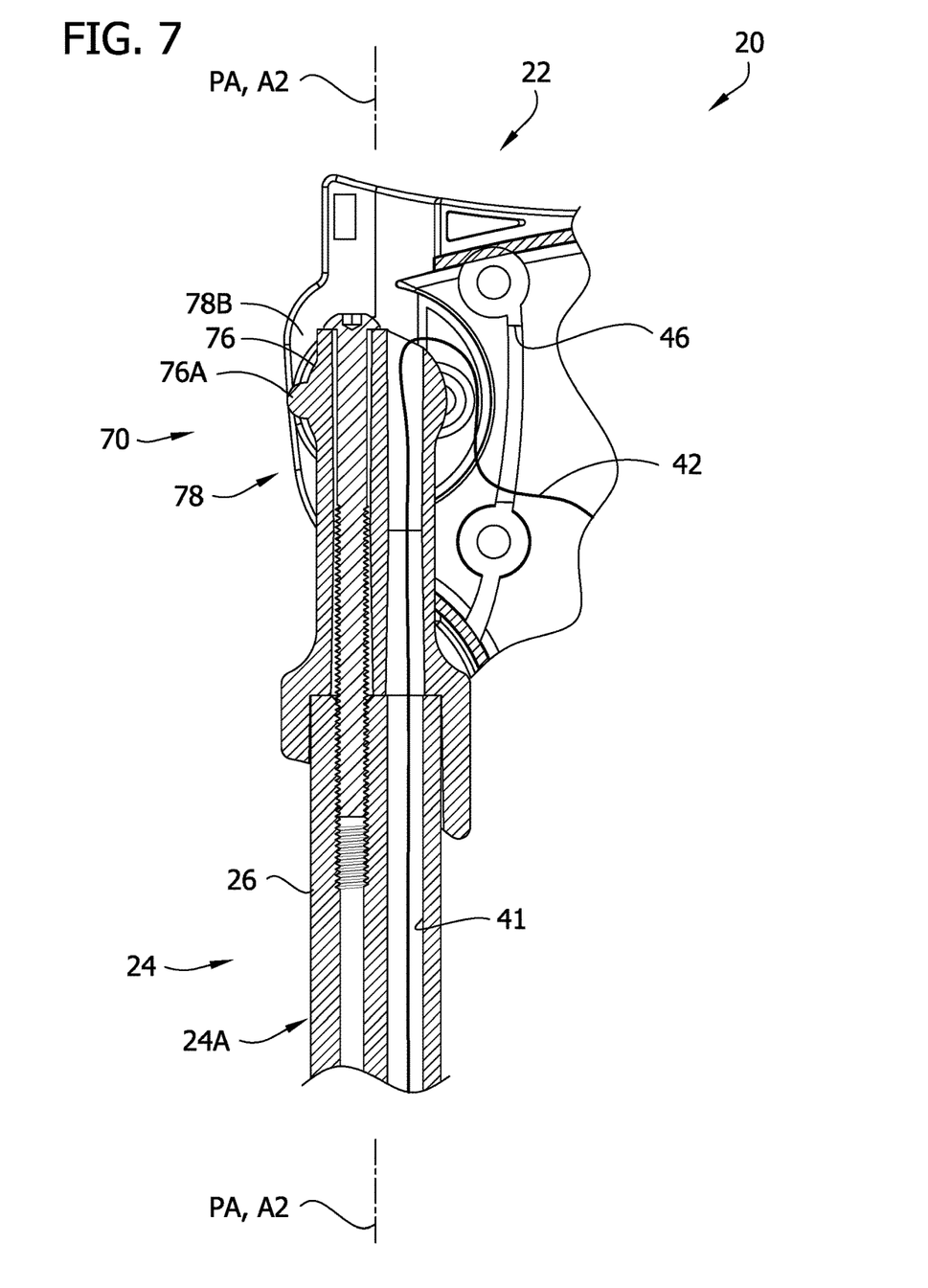
FIG. 7 is an enlarged fragmentary section similar to FIG. 6 but showing the arm in the stowed position.
Figure 8:
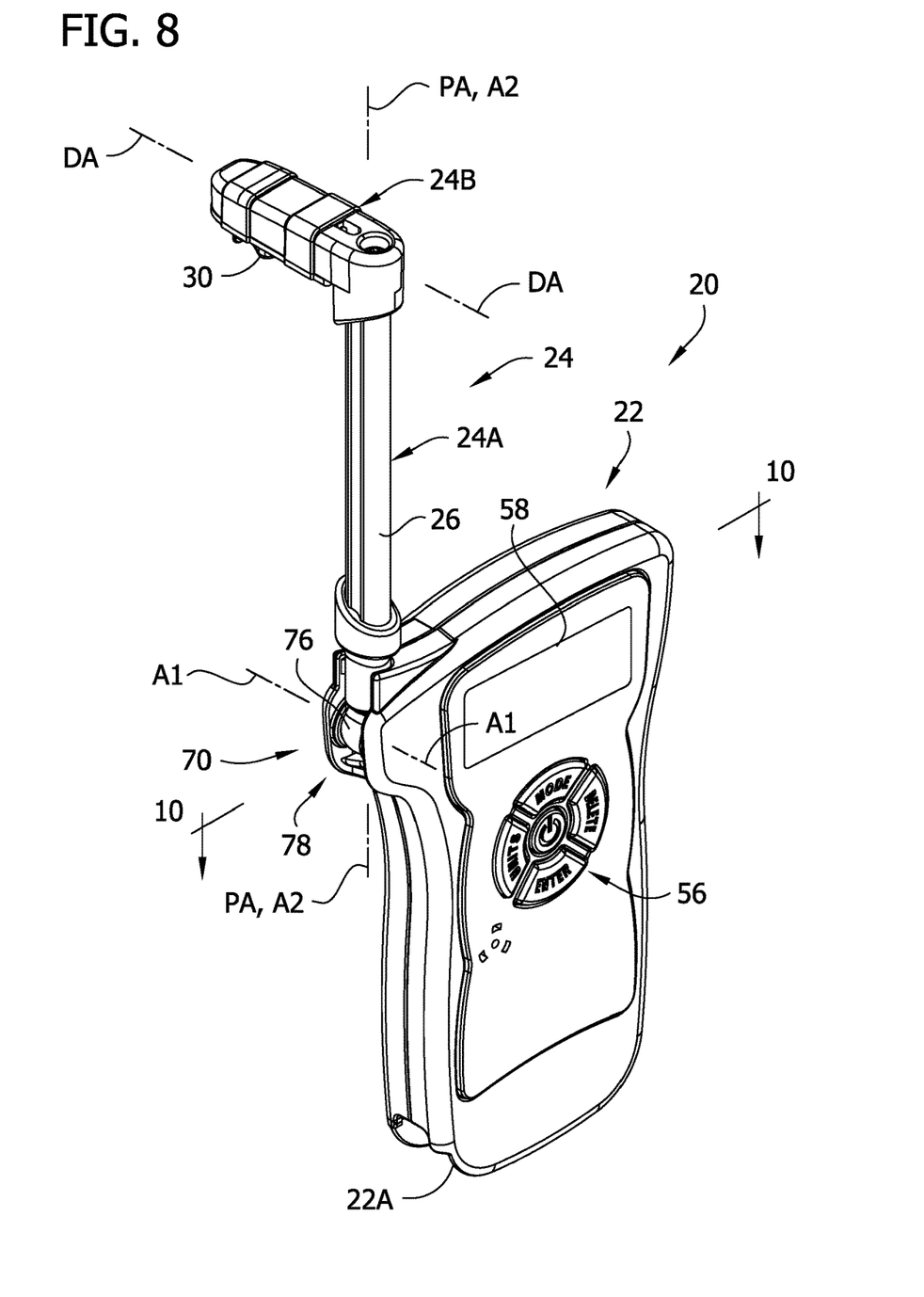
FIG. 8 is a front perspective of the trigger gauge having the arm in the deployed position and the distal portion of the arm pivoted rearward with respect to the housing.
Figure 9:
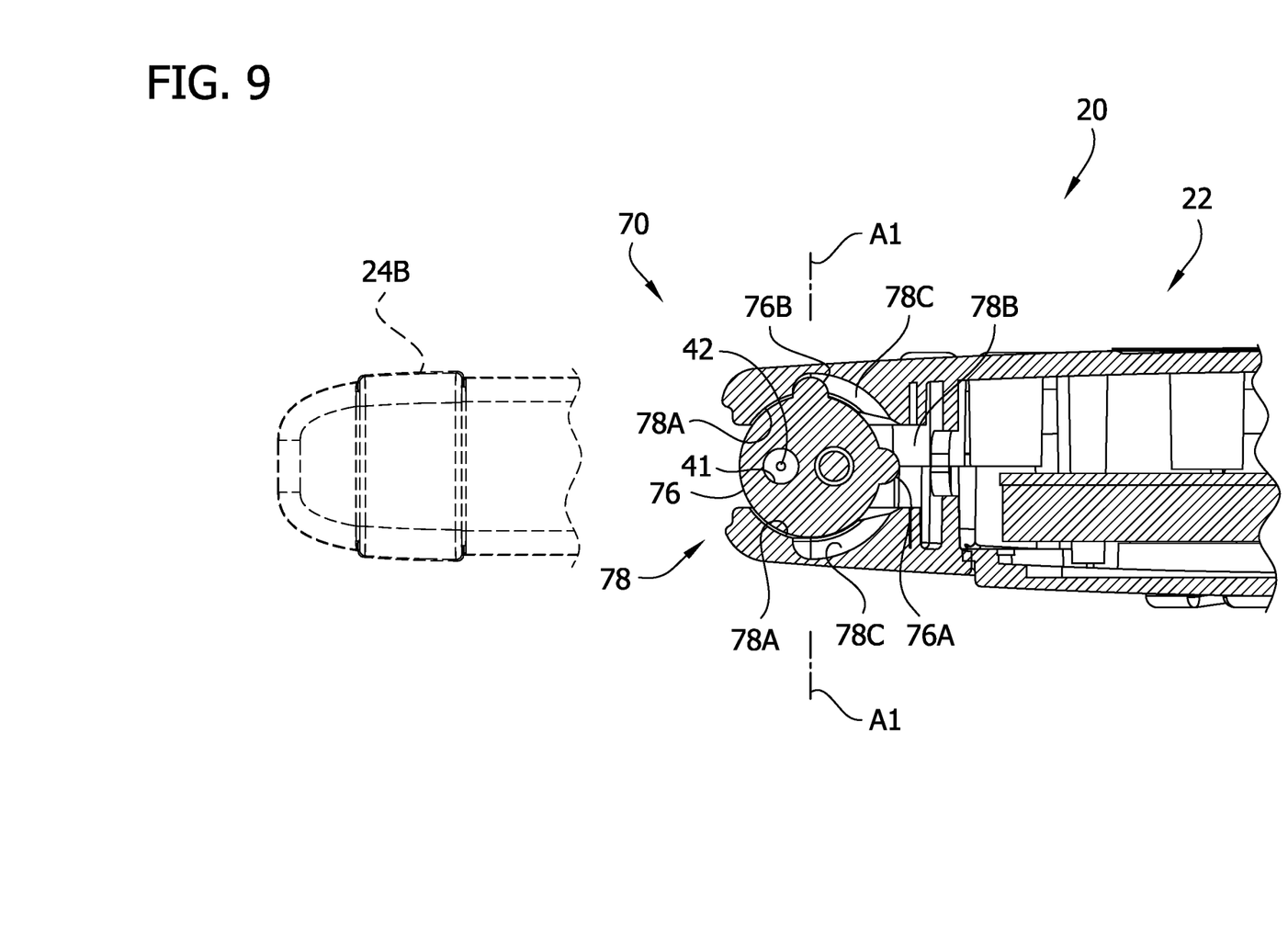
FIG. 9 is an enlarged fragmentary section of the trigger gauge taken in a plane including line 9-9 of FIG. 1, a part of the distal portion of the arm being superimposed on the section in broken lines.
Figure 10:
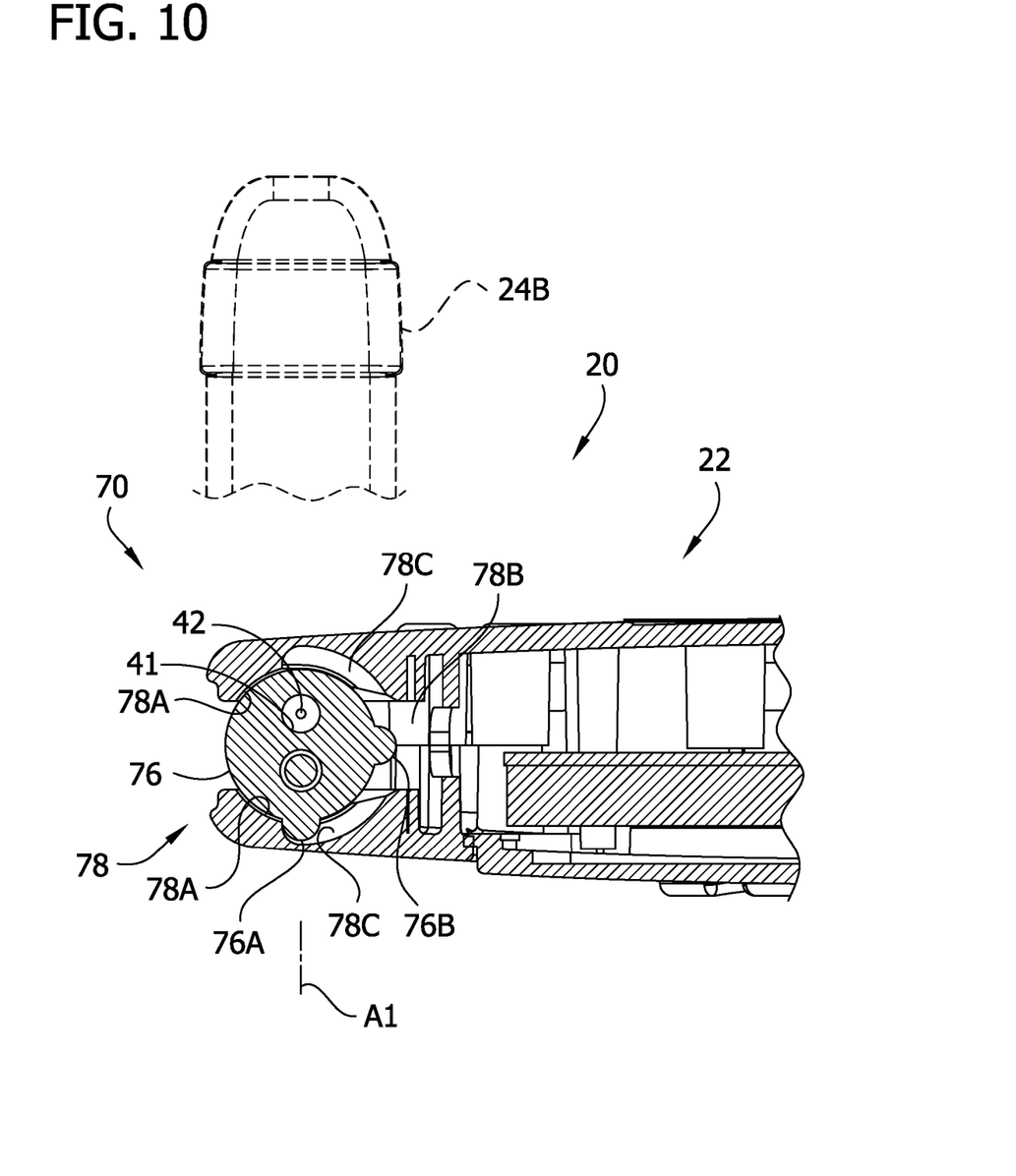
FIG. 10 is an enlarged fragmentary section of the trigger gauge taken in a plane including line 10-10 of FIG. 8, a part of the distal portion of the arm being superimposed on the section in broken lines.

As shown in FIG. 8, the pivot connection 70 is also configured to permit the arm 24 to pivot about a second pivot axis A2 in the deployed position for adjusting an orientation of the distal portion 24B of the arm with respect to the housing 22. In the illustrated embodiment, the second pivot axis A2 is the same as the longitudinal axis PA of the proximal arm portion 24A. To permit such pivoting, the forward and rear cup-shaped portions 78A of the socket include respective horizontal arcuate tracks 78C (see, FIG. 5). The horizontal arcuate tracks 78C have respective open ends adjacent the vertical track 78B and respective closed ends opposite the open ends. The second rounded protrusion 76B is usually received in the horizontal arcuate track 78C of the rear cup-shaped portion 78A adjacent its closed end, as shown in FIG. 9. The first pivot axis A1 extends through the second rounded protrusion 76B. When the arm 24 is pivoted from the deployed position to the stowed position, and vice versa, the first rounded protrusion 76A travels along the vertical track 78B, as shown in FIGS. 6 and 7, and the second rounded protrusion 76B rotates in the closed end of the rear horizontal arcuate track 78C about the first pivot axis A1. When the arm 24 is in the deployed position, the first rounded protrusion 76A, in the vertical arcuate track 78B, is between the open ends of the forward and rear horizontal arcuate tracks 78C. As shown by comparison of FIGS. 9 and 10, this permits the arm 24 to be pivoted about the second pivot axis A2, by moving the first rounded protrusion 76A into the forward horizontal arcuate track 78C and moving the second rounded protrusion 76B away from the closed end of the rear horizontal arcuate track 78C. Pivoting of the arm 24 about the second pivot axis A2 is limited by engagement of the first rounded protrusion 76A with the closed end of the forward horizontal arcuate track 78C. In the illustrated embodiment, the arrangement permits about 90 degrees of pivoting for pivoting the distal arm portion 24B rearward with respect to the housing 22.

In use, the arm 24 is pivoted about the first pivot axis A1 from the stowed position (e.g., FIGS. 4, 7) to the deployed position (e.g., FIGS. 1, 6) to position the trigger engagement head 30 for pressing on the trigger. The user inserts the distal portion 24B of the arm 24 in the trigger guard of the weapon, and pulls on the housing 22 to force the trigger engagement head 30 against the trigger. If desired, in the deployed position, the arm 24 can be pivoted about the second pivot axis A2 to change the orientation of the distal portion 24B of the arm with respect to the housing 22 to facilitate engaging the trigger engagement head 30 with the trigger. The strain gauge 38 generates electrical signals representative of the strain in the bar 36 of the load cell 34, and the electrical signals are transmitted along the at least one electronic signal transmission line 42 to the gauge controller 52. The gauge controller 52 determines a trigger pull force value based on the signals from the load cell 34, and transmits a trigger pull force value signal to the display 58, which in response displays a trigger pull force value. Various modes and settings can be accessed by the user via the user input 56. When the user is finished using the trigger gauge 20, the arm 24 can be pivoted back to the stowed position to protect the load cell 34 in the recess 22A in the lower end of the housing 22.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A trigger gauge for measuring a pull force of a trigger of a weapon, the gauge comprising:
    a housing sized to be held by a hand of a user,
    an arm supported by the housing, the arm having a proximal portion operatively connected to the housing and having a distal portion, and
    a load cell located at the distal portion of the arm, the load cell including a trigger engagement head configured for engaging the trigger,
    wherein the load cell is operable to generate an electrical signal responsive to a force on the trigger engagement head for measuring the pull force of the trigger.

2. A trigger gauge as set forth in claim 1, wherein the load cell includes a strain gauge.

3. A trigger gauge as set forth in claim 2, wherein the load cell includes a bar having a proximal section and a distal section, the bar being mounted on the distal portion of the arm to permit deflection of the bar about its proximal section, the trigger engagement head and the strain gauge being mounted on the bar distally of the proximal section.

4. A trigger gauge as set forth in claim 3 wherein the strain gauge is mounted on the bar at a location between the trigger engagement head and the proximal section of the bar.

5. A trigger gauge as set forth in claim 1, further comprising a display operably connected to the load cell, the display being supported by the housing and operable to display a trigger pull force value representative of force applied to the trigger engagement head.

6. A trigger gauge as set forth in claim 1, further comprising at least one electrical signal transmission line extending along the arm from the load cell to the housing for transmitting said electrical signal.

7. A trigger gauge as set forth in claim 1, wherein the distal portion has a longitudinal axis extending in a first direction relative to the housing, and the proximal portion has a longitudinal axis extending in a second direction with respect to the housing, the second direction being transverse to the first direction.

8. A trigger gauge as set forth in claim 7, wherein the load cell is at least partially housed in the distal portion of the arm.

9. A trigger gauge as set forth in claim 1, wherein the arm is connected to the housing via a pivot connection permitting the arm to pivot with respect to the housing about a first pivot axis between a deployed position and a stowed position, the trigger engagement head in the deployed position being spaced from the housing for engaging the trigger, and the trigger engagement head in the stowed position being closer to the housing than in the deployed position.

10. A trigger gauge as set forth in claim 9, wherein the pivot connection permits the arm to pivot with respect to the housing about a second pivot axis different than the first pivot axis.

11. A trigger gauge as set forth in claim 9, wherein the distal portion of the arm has a longitudinal axis extending in a first direction relative to the housing, the proximal portion of the arm has a longitudinal axis extending in a second direction transverse to the first direction, and, in the deployed position, at least the distal portion is pivotable with respect to the housing about a second pivot axis different than the first pivot axis to change the orientation of the longitudinal axis of the distal portion with respect to the housing.

12. A trigger gauge as set forth in claim 1, wherein the load cell is separate from and mounted on the distal portion of the arm.

13. A trigger gauge as set forth in claim 12, wherein the load cell includes a deflection member having the trigger engagement head secured thereto, the strain gauge being arranged to measure strain in the deflection member.

14. A trigger gauge as set forth in claim 13, wherein the deflection member is at least partially housed in the distal portion of the arm, the trigger engagement head being at least partially outside the distal portion of the arm for engaging the trigger.

15. A trigger gauge as set forth in claim 1, wherein the trigger engagement head is a separate piece from the arm and is connected to the distal portion of the arm, the trigger engagement head being movable with respect to the distal portion of the arm responsive to application of the trigger engagement head to the trigger.

16. A method of measuring a pull force of a trigger of a weapon, the method comprising:
   providing a trigger gauge including a housing and an arm supported by the housing, the arm including a distal portion having a load cell thereon spaced from the housing,
   pressing a trigger engagement head of the load cell against the trigger to cause the load cell to generate an electrical signal for measuring the pull force of the trigger, and
   displaying a trigger pull force value on a display of the trigger gauge representative of the pull force of the trigger.

17. A method as set forth in claim 16, further comprising transmitting the electrical signal from the load cell to a gauge controller in the housing.

18. A method as set forth in claim 17, wherein the electrical signal is transmitted to the gauge controller via an electrical signal transmission line extending along the arm.

19. A method as set forth in claim 16, further comprising pivoting the arm from a deployed position with respect to the housing to a stowed position with respect to the housing different than the deployed position, the trigger engagement head in the stowed position being closer to the housing than in the deployed position.

20. A method as set forth in claim 16, wherein pressing the trigger engagement head of the load cell against the trigger causes the trigger engagement head to move with respect to the distal portion of the arm to generate the electrical signal for measuring the pull force of the trigger.

21. A trigger gauge for measuring a pull force of a trigger of a weapon, the gauge comprising:
   a housing sized to be held by a hand of a user,
   an arm supported by the housing, the arm having a proximal portion operatively connected to the housing and having a distal portion,
   a trigger engagement head located at the distal portion of the arm configured for engaging the trigger, and
   a display supported by the housing operable to display a trigger pull force value representative of a pull force applied to the trigger engagement head,
   wherein the arm is connected to the housing via a pivot connection, the pivot connection permitting the arm to pivot with respect to the housing about a first pivot axis between a deployed position and a stowed position different than the deployed position, the trigger engagement head in the deployed position being spaced from the housing for engaging the trigger, and the trigger engagement head in the stowed position being closer to the housing than in the deployed position.

22. A trigger gauge as set forth in claim 21, wherein the housing includes a receiver configured for receiving at least a portion of the trigger engagement head in the stowed position.

23. A trigger gauge as set forth in claim 21, wherein the arm in the deployed position extends away from the housing, and the arm in the stowed position is adjacent to and extends along the housing.

24. A trigger gauge as set forth in claim 21, wherein the pivot connection permits the arm to pivot with respect to the housing about a second pivot axis different than the first pivot axis.

25. A trigger gauge as set forth in claim 21, wherein the distal portion of the arm has a longitudinal axis extending in a first direction relative to the housing, the proximal portion of the arm has a longitudinal axis extending in a second direction transverse to the first direction, and, in the deployed position, at least the distal portion of the arm is pivotable with respect to the housing about a second pivot axis to change the orientation of the longitudinal axis of the distal portion with respect to the housing.

26. A trigger gauge as set forth in claim 21, wherein the housing has a longitudinal center plane dividing the housing, the longitudinal center plane having a first side and a second side opposite the first side, the arm in the deployed position being offset to the first side of the longitudinal center plane, and the arm in the stowed position being offset to the first side of the longitudinal center plane.

\* \* \* \* \*